(12) United States Patent
Qian et al.

(10) Patent No.: US 9,128,915 B2
(45) Date of Patent: Sep. 8, 2015

(54) SYSTEM AND METHOD FOR UTILIZING MULTIPLE ENCODINGS TO IDENTIFY SIMILAR LANGUAGE CHARACTERS

(75) Inventors: Jun Qian, Pasadena, CA (US); Sofiane Ouaguenouni, Arcadia, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 379 days.

(21) Appl. No.: 13/566,385

(22) Filed: Aug. 3, 2012

(65) Prior Publication Data

US 2014/0052436 A1 Feb. 20, 2014

(51) Int. Cl.
G06F 17/28 (2006.01)
G06F 17/20 (2006.01)
G06K 9/00 (2006.01)
G06K 9/18 (2006.01)
G06F 17/22 (2006.01)

(52) U.S. Cl.
CPC ................... *G06F 17/2223* (2013.01)

(58) Field of Classification Search
CPC ......... G06F 3/02; G06F 3/0227; G06F 3/023; G06F 3/018; G06F 3/0233–3/0238; G06F 17/2223; G06F 17/2217; G06K 2209/01; G06K 2209/011; G06K 2209/013
USPC ........... 704/4, 705, 776, 2, 7, 706, 9, 748, 18, 704/12, 14; 382/181
See application file for complete search history.

(56) References Cited

U.S. PATENT DOCUMENTS 6,009,424 A * 12/1999 Lepage et al. .................. 1/1
6,646,573 B1 * 11/2003 Kushler et al. ............ 341/28
7,257,528 B1 * 8/2007 Ritchie et al. .................. 704/7
7,620,538 B2 * 11/2009 Marcu et al. .................. 704/2
7,706,616 B2 * 4/2010 Kristensson et al. ......... 382/187
7,880,730 B2 * 2/2011 Robinson et al. ............. 345/173
8,229,732 B2 * 7/2012 Davtchev et al. ............ 704/8
8,234,106 B2 * 7/2012 Marcu et al. .................. 704/2
8,438,142 B2 * 5/2013 Wu et al. ...................... 707/705

(Continued)

OTHER PUBLICATIONS

Liu et al., Visually and Phonologically Similar Characters in Incorrect Simplified Chinese Words, Coling 2010: Poster Volume, pp. 739-747, Beijing, Aug. 2010.*

(Continued)

*Primary Examiner* — Pierre-Louis Desir
*Assistant Examiner* — Anne Thomas-Homescu
(74) *Attorney, Agent, or Firm* — Tucker Ellis LLP

(57) ABSTRACT

Described herein are systems and methods for identifying the similarity between language characters. As described herein, a pair of language characters is received at a language character match engine. The language character match engine is adapted to receive encoding configuration information from each of a plurality of encoding components, and is adapted to encode the pair of language characters based on the unique structure of each language character to generate a pair of string identification characters for each encoding component. Thereafter, each pair of string identification characters is compared to one another to generate a similarity score, and the similarity score for each pair of string identification characters is combined to create a composite similarity score. The composite similarity score represents a similarity between the pair of language characters, and is used to identify the similarity between the pair of language characters.

20 Claims, 9 Drawing Sheets
(1 of 9 Drawing Sheet(s) Filed in Color)

(56) References Cited

U.S. PATENT DOCUMENTS

| | | | |
|---|---|---|---|
| 8,645,391 B1* | 2/2014 | Wong et al. | 707/748 |
| 8,782,029 B1* | 7/2014 | Yee et al. | 707/706 |
| 8,825,694 B2* | 9/2014 | Samuelson et al. | 707/767 |
| 2002/0128831 A1* | 9/2002 | Ju et al. | 704/231 |
| 2004/0181527 A1* | 9/2004 | Burdick et al. | 707/6 |
| 2005/0154664 A1* | 7/2005 | Guy et al. | 705/35 |
| 2005/0171965 A1* | 8/2005 | Fujimoto et al. | 707/100 |
| 2007/0022134 A1* | 1/2007 | Zhou et al. | 707/102 |
| 2008/0168049 A1* | 7/2008 | Gao et al. | 707/5 |
| 2009/0007271 A1* | 1/2009 | Huang et al. | 726/26 |
| 2009/0012776 A1* | 1/2009 | Chino et al. | 704/7 |
| 2009/0070095 A1* | 3/2009 | Gao | 704/2 |
| 2009/0319257 A1* | 12/2009 | Blume et al. | 704/7 |
| 2010/0281020 A1* | 11/2010 | Drubner | 707/722 |
| 2010/0325614 A1* | 12/2010 | Zeidman | 717/123 |
| 2011/0137636 A1* | 6/2011 | Srihari et al. | 704/2 |
| 2011/0320186 A1* | 12/2011 | Butters et al. | 704/9 |
| 2012/0047172 A1* | 2/2012 | Ponte et al. | 707/776 |
| 2012/0078919 A1* | 3/2012 | Mineno | 707/748 |
| 2012/0089632 A1* | 4/2012 | Zhou et al. | 707/769 |
| 2012/0146910 A1* | 6/2012 | Griffin | 345/168 |
| 2012/0150955 A1* | 6/2012 | Tseng | 709/204 |
| 2012/0323877 A1* | 12/2012 | Ray et al. | 707/706 |
| 2012/0326984 A1* | 12/2012 | Ghassabian | 345/168 |
| 2013/0173247 A1* | 7/2013 | Hodson | 704/4 |
| 2013/0325882 A1* | 12/2013 | Deshpande et al. | 707/755 |
| 2014/0059033 A1* | 2/2014 | Shaw et al. | 707/708 |
| 2014/0184843 A1* | 7/2014 | Campbell et al. | 348/222.1 |

OTHER PUBLICATIONS

Kondrak and Dorr, Identification of confusable drug names: a new approach and evaluation methodology, Coling '04 Proceedings of the 20th international conference on Computational Linguistics, 2004.*

Kondrak, N-Gram Similarity and Distance, String Processing and Information Retrieval, Lecture Notes in Computer Science, vol. 3772, 2005, pp. 115-126.*

Liu, Chao-Lin, et al., "Using Structural Information for Identifying Similar Chinese Characters", Proceedings of ACL-08: HLT, Short Papers (Companion Volume), pp. 93-96, Columbus, Ohio, USA, Jun. 2008. © 2008 Association for Computational Linguistics.

* cited by examiner

US 9,128,915 B2

SYSTEM AND METHOD FOR UTILIZING MULTIPLE ENCODINGS TO IDENTIFY SIMILAR LANGUAGE CHARACTERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to software, and are particularly related to systems and methods for utilizing multiple encodings to identify similar language characters for use in a middleware machine or other environments.

BACKGROUND

Traditionally, Chinese character data entry into a computer has been accomplished by: (1) using a phonetic encoding method, and (2) using a structure-based encoding method. Under phonetic encoding, such as PinYin, a person types the Roman characters that represent the sound of a Chinese character, and a list of Chinese characters that have that sound is presented. The person then selects the appropriate Chinese character from the list of Chinese characters that are presented.

Under structure-based encoding, such as Wubi, Cangjie, and Four-Corner, each Chinese character is encoded into a string of Roman characters based on the Chinese characters' structure. The encoded string of characters contains the structural information of the Chinese character, and can be used to determine the structural similarity of the Chinese character to other Chinese characters. This is because if two Chinese characters look similar, then their encoded strings are similar, and if two Chinese characters' encoded strings are similar, then the corresponding Chinese characters look similar.

However, because many Chinese characters are either similarly pronounced and/or similar in appearance, mistakes can be made during data entry. For example, mistakes can be made due to the structural similarity of the Chinese characters, where a Chinese character is read/interpreted incorrectly by the data entry clerk because the data entry clerk wrongly identified the Chinese character for a different (but similar looking) Chinese character. Mistakes can also be made when using a phonetic input method, where a different character that has the same (or similar) pronunciation is selected during data entry. Mistakes can further be made due to using an inappropriate structure-based input method, where a different character that has a similar encoding is entered.

These are the areas that embodiments of the invention are intended to address.

SUMMARY

Described herein are systems and methods for identifying the similarity between language characters. As described herein, a pair of language characters is received at a language character match engine. The language character match engine is adapted to receive encoding configuration information from each of a plurality of encoding components, and is adapted to encode the pair of language characters based on the unique structure of each language character to generate a pair of string identification characters for each encoding component. Thereafter, each pair of string identification characters is compared to one another to generate a similarity score, and the similarity score for each pair of string identification characters is combined to create a composite similarity score. The composite similarity score represents a similarity between the pair of language characters, and is used to identify the similarity between the pair of language characters.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
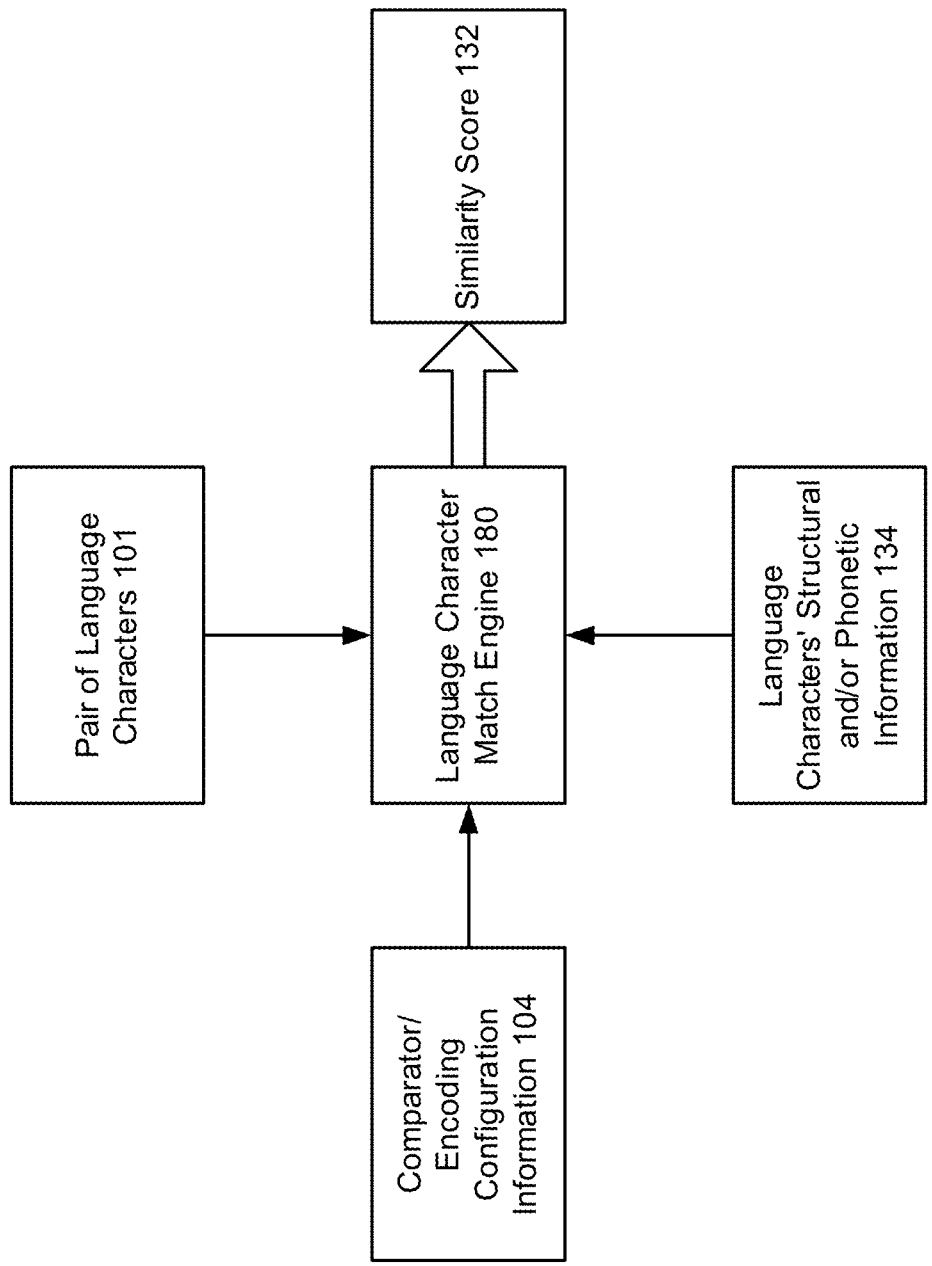
FIG. 1 shows an exemplary system for identifying a similarity between language characters for use in an application server or other environment, in accordance with an embodiment of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

As described above, many Chinese language characters are either similarly pronounced and/or similar in appearance, and because of this, mistakes can be made during data entry and/or data comparison involving Chinese characters. Typically, when computing the similarity between two Chinese characters, a phonetic encoding and/or structure-based encoding method can be used. Wubi encoding is typically chosen as the structure-based encoding method. However, since the main purpose of Wubi is for fast Chinese character data entry, there are situations where encoding Chinese characters using Wubi is not very useful for determining the similarity between Chinese characters. For example, the Wubi structure-based encoding method only encodes the first three and the last structural components of the Chinese character, and when the Chinese character includes a lot of strokes, or few strokes, some component information will be missing; and thus, increasing the likelihood of mistakes made during data entry and/or data comparison.

Other structure-based encoding methods can be used to determine the similarity between two Chinese characters. For example, the Four-Corner structure-based encoding method looks at the four corners of the Chinese character to encode the Chinese character. However, the Four-Corner structure-based encoding method does not take into consideration the internal structure of the character, and like the Wubi structure-based encoding method, some component information will be missing. In addition to the Wubi and the Four-Corner structure-based encoding methods, other structure-based encodings can be used but they too have limitations, either because they are ancient and not in common usage today, or they were originally targeting traditional Chinese and are no longer in common use (such as Cangjie).

However, although each structure-based encoding method provides limited information regarding the structure of a Chinese language character, each encoding method looks at the Chinese language characters' structure from a different perceptive, and thus, each encoding method provides insight into different aspects of the structure of Chinese language characters. Accordingly, in accordance with an embodiment of the invention, no single structure-based encoding method is relied on to compute the structural similarity between a pair of language characters (e.g., Chinese characters). Instead, multiple structure-based encoding methods are used to perform a composite comparison between a pair of language characters, where each encoding method produces a similarity score reflecting the similarity of the pair of language characters under the given encoding method. Thereafter, the similarity score generated from each encoding component is combined to generate a composite similarity score that represents the structural similarity between the pair of language characters.

Similarity Score

FIG. 1 shows an exemplary system for identifying the similarity between language characters for use in an application server or other environment, in accordance with an embodiment of the invention. As shown in FIG. 1, inputs to a language character match engine 180 include a pair of language characters 101 (e.g., Chinese language characters), and the output of the language character match engine 180 is a similarity score 132. The similarity score 132 represents the similarity between the pair of language characters 101.

The language character match engine 180 can be configured using comparator/encoding configuration information 104, and language characters' structural and/or phonetic information 134. Language characters' structural and/or phonetic information 134 includes structural and/or phonetic information used by the language character match engine 180 to configure structural and/or phonetic comparators. Comparator/encoding configuration information 104 includes configuration information to configure a plurality of structure-based comparator/encoding components and/or one or more phonetic comparator/encoding components. For example, for a comparison between a pair of language characters based only on the structure of the pair of language characters, the language character match engine 180 is configured using a list of structure-based comparator/encoding components included in the comparator/encoding configuration information 104, and only structural information in language characters' structural and/or phonetic information 134 is utilized to configure the structure-based comparator/encoding components. For a comparison between the pair of language characters based only on the phonetic information of the pair of language characters, the language character match engine 180 is configured using a list of phonetic-based comparator/encoding components included in the comparator/encoding configuration information 104, and only phonetic information in language characters' structural and/or phonetic information 134 is utilized to configure the phonetic-based comparator/encoding components. For a comparison between the pair of language characters based on the structure and phonetic information of the pair of language characters, the language character match engine 180 is configured using both the list of structure-based comparator/encoding components and the list of phonetic-based comparator/encoding components included in the comparator/encoding configuration information 104, and both structural information and phonetic information in language characters' structural and/or phonetic information 134 is utilized to configure the structure-based comparator/encoding components and phonetic based comparator/encoding components.

In accordance with an embodiment of the invention, one or more of the following structure-based comparator/encoding components can be used by the language character match engine 180 or other system component:

A Wubi comparator/encoder component, which is a string comparator that compares two Chinese language characters' encoded string identification characters under the Wubi input method. The Wubi comparator/encoder uses the Wubi encoding algorithm, where different strokes are mapped to five different regions of the keyboard. The match/mismatch score matrix is specially designed by taking the five regions into consideration. For example, A,S,D,F,G all represent horizontal stroke and H,J,K,L,M all represent vertical stroke, and a mismatch between F and G is not as important as a mismatch between F and H;

A Cangjie comparator/encoder component, which is a string comparator that compares two Chinese language characters' encoded string identification characters under the Cangjie input method;

A Four-Corner comparator/encoder component, which is a string comparator that compares two Chinese language characters' encoded string identification characters under the Four-Corner input method. The Four-Corner comparator/encoder component considers the top/bottom and left/right corner positions of the Chinese character during comparison. For example, for each position (e.g., the upper-left corner), the encoded string identification characters for that position is one digit, and the encoded string identification characters of that position, for each Chinese language character, is compared to one another;

A Radical comparator/encoder component which compares two Chinese language characters' radicals, and since a Chinese language character's radical is also a Chinese character, the radical comparator/encoder component is a specially configured instance of a composite comparator/encoder component;

A Strokes comparator/encoder component, which is a string comparator that compares two Chinese language characters' strokes;

A Non-radical strokes comparator/encoder component, which is a string comparator that compares two Chinese language characters' non-radical strokes;

A Total stroke count comparator/encoder component, which is a simple integer comparator that compares two Chinese language characters' total stroke count. For example, suppose the two Chinese characters' total stroke count is m and n, respectively, then the similarity score defined by the total stroke count comparator/encoder component is min(m,n)/max(m,n);

A Non-radical stroke count comparator/encoder component, which is a simple integer comparator that compares two Chinese language characters' non-radical stroke count. For example, suppose the two Chinese characters' non-radical stroke count is m and n, respectively, then the similarity score defined by the non-radical stroke count comparator/encoder component is min(m,n)/max(m,n); and A Composite comparator/encoder component, which is a language character comparator that utilizes multiple comparator/encoder components (e.g., structural and/or phonetic components), or other composite comparator/encoder components, to compute a composite similarity score between two language characters (e.g., Chinese language characters). By combining multiple component comparators and assigning different weights to each individual component comparator, a composite comparator/encoder component provides a more comprehensive view of the two language characters' internal structures.

For example, the similarity score can be used to provide for accurate data matching between language characters to avoid data duplication and other errors in certain environments, such as the health care industry. In the health care industry, it has been difficult to avoid data duplication of patient and provider information received in a character-based language (as opposed to an alphabet based language) such as Chinese and Japanese. Accordingly, software incorporating data matching capabilities, such as Oracle's Healthcare Master Person Index software, can be used to provide for data matching of patient and provider information to identify, merge and de-duplicate patient and provider identifies and demographic information from multiple systems to provide health care providers the ability to identify and avoid data duplication and errors.

Figure 2:
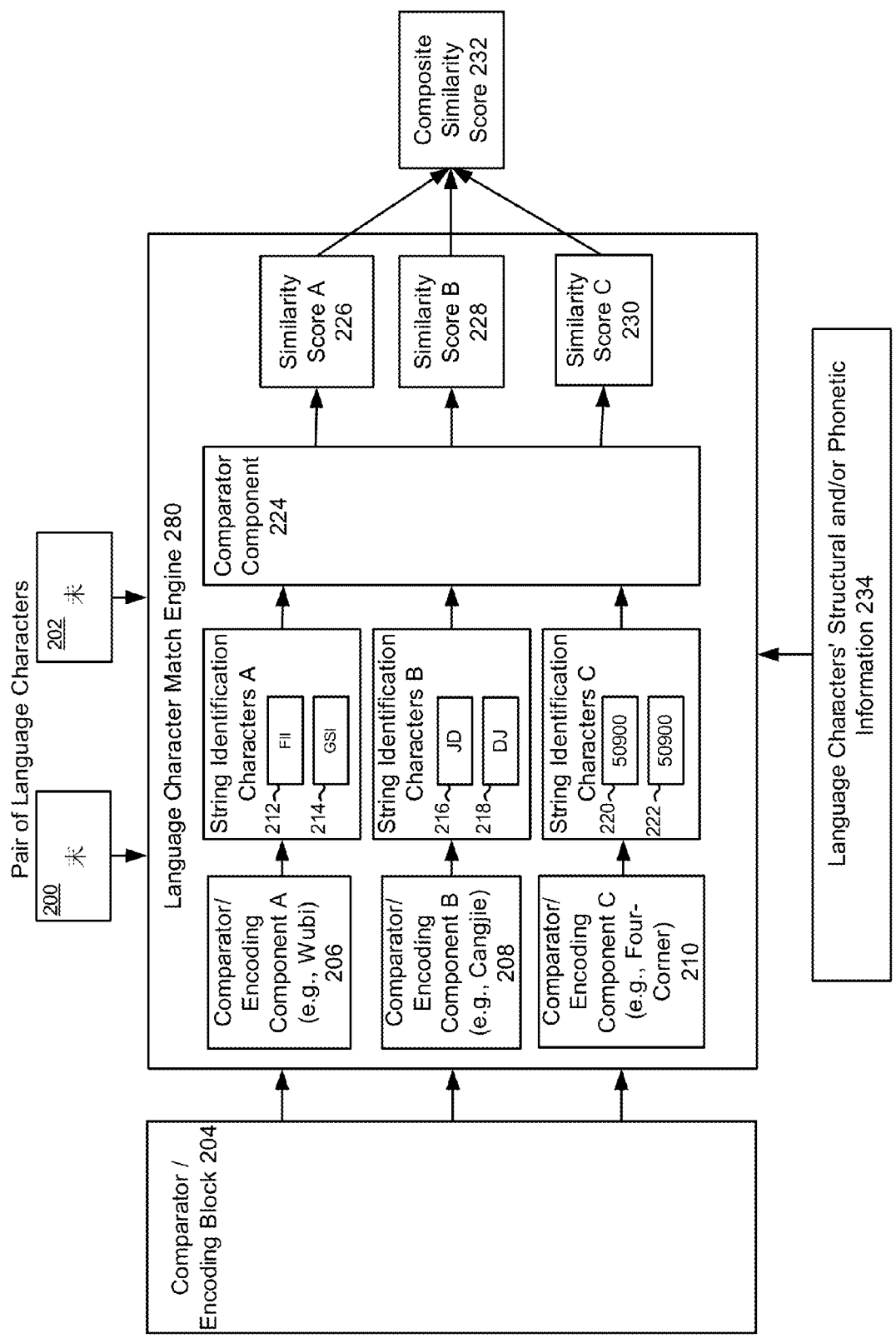
FIG. 2 shows an exemplary system for identifying a similarity between language characters for use in an application server or other environment, in accordance with an alternate embodiment of the invention.

FIG. 2 shows an exemplary system for identifying the similarity between language characters for use in an application server or other environment, in accordance with an embodiment of the invention. As shown in FIG. 2, a pair of language characters (200, 202) is received at a language character match engine 280. The pair of language characters (200, 202) can be Chinese language characters or any other language characters. The pair of language characters have a unique structure that can include any number of horizontal and vertical lines, in addition to curved lines and shapes.

The language character match engine 280 can be configured using comparator/encoding configuration information received from a comparator/encoding block 204, and structural and phonetic information received from a language characters' structural and/or phonetic information component 234. The comparator/encoding block 204 includes a list of three structure-based comparator/encoding components (206, 208 and 210), that are used to encode the pair of language characters (200, 202). Although three comparator/encoding components are shown, more or fewer comparator/encoding components can be used. The three structure-based comparator/encoding components (206, 208 and 210) are configured by the language character match engine 280 using only structural information from the language characters' structural and/or phonetic information 234 component.

Comparator/encoding component A uses a Wubi comparator/encoding method, comparator/encoding component B uses a Cangjie comparator/encoding method, and comparator/encoding component C uses a Four-Corner comparator/encoding method. Each language character (200, 202) is encoded according to the methodology of the comparator/encoding method used, and although Wubi, Cangjie, and Four-Corner comparator/encoding methods are shown, other comparator/encoding methods can be used.

When encoding the pair of language characters (200, 202), each comparator/encoding component (206, 208 and 210) generates a pair of string identification characters (e.g., a string of Roman characters), where each string of identification characters represents the unique structure of one of the language characters. For example, comparator/encoding component A generates a pair of string identification characters (212, 214), where the string of identification characters 212 is associated with language character 200, and the string of identification characters 214 is associated with language character 202. Likewise, comparator/encoding component B generates a pair of string identification characters (216, 218), where the string of identification characters 216 is associated with language character 200, and the string of identification characters 218 is associated with language character 202; and comparator/encoding component C generates a pair of string identification characters (220, 222), where the string of identification characters 220 is associated with language character 200, and the string of identification characters 222 is associated with language character 202.

A comparator component 224 compares the string of identification characters for each pair of string identification characters to one another based on the comparator/encoding configuration information received from the language characters' structural and/or phonetic information component 234. For example, comparator/encoding component A generates a pair of string identification characters 212 and 214, where string identification characters 212 is represented by the string of characters "FII", and string identification characters 214 is represented by the string of characters "GSI". The comparator component 224 receives the pair of string identification characters, and compares string identification characters 212 to string identification characters 214 to generate a similarity score A 226. The similarity score A 226 represents the similarity between string identification characters 212 and string identification characters 214 as encoded by comparator/encoding component A.

The comparator component 224 further compares the pair of string identification characters generated by comparator/encoding component B (i.e., string identification characters 216 and 218) to one another, and the pair of string identification characters generated by comparator/encoding component C (i.e., string identification characters 220 and 222) to one another to generate similarity score B 228 and similarity score C 230, respectively.

The similarity scores generated by each of the plurality of comparator/encoding components (i.e., similarity scores 226, 228 and 230) are combined (e.g., added together) to create a composite similarity score 232 for the pair of language characters. The composite similarity score represents the similarity between the pair of language characters (200, 202), and can be used to determine the similarity of language character 200 to language character 202.

It will be evident that the Table 1 is provided for purposes of illustration, and that in accordance with other embodiments, other comparator/encoding methods can be used to generate a string of characters based on a Chinese language character.

TABLE 1

| Chinese Character | Wubi Encoding | Cangjie Encoding | Four-Corner Encoding | Strokes |
|---|---|---|---|---|
| 朩 | FII | JD | 50900 | ·丨丿丶 |
| 木 | GSI | DJ | 50900 | 一丨丿丶 |
| 入 | WWWW | O | 80000 | 丿丶 |
| 人 | TYI | OH | 80000 | 丿丶 |

Referring to Table 1, by way of example, two pairs of Chinese characters are provided. The far right column shows the strokes used to create the unique structure of the Chinese characters. Also shown in Table 1 are the encodings based on a Wubi, a Cangjie and a Four-Corner encoding method for the two pairs of Chinese characters. The encodings are represented by a string of Roman characters, where each encoding is generated based on the structural information of each Chinese language character.

Figure 3:
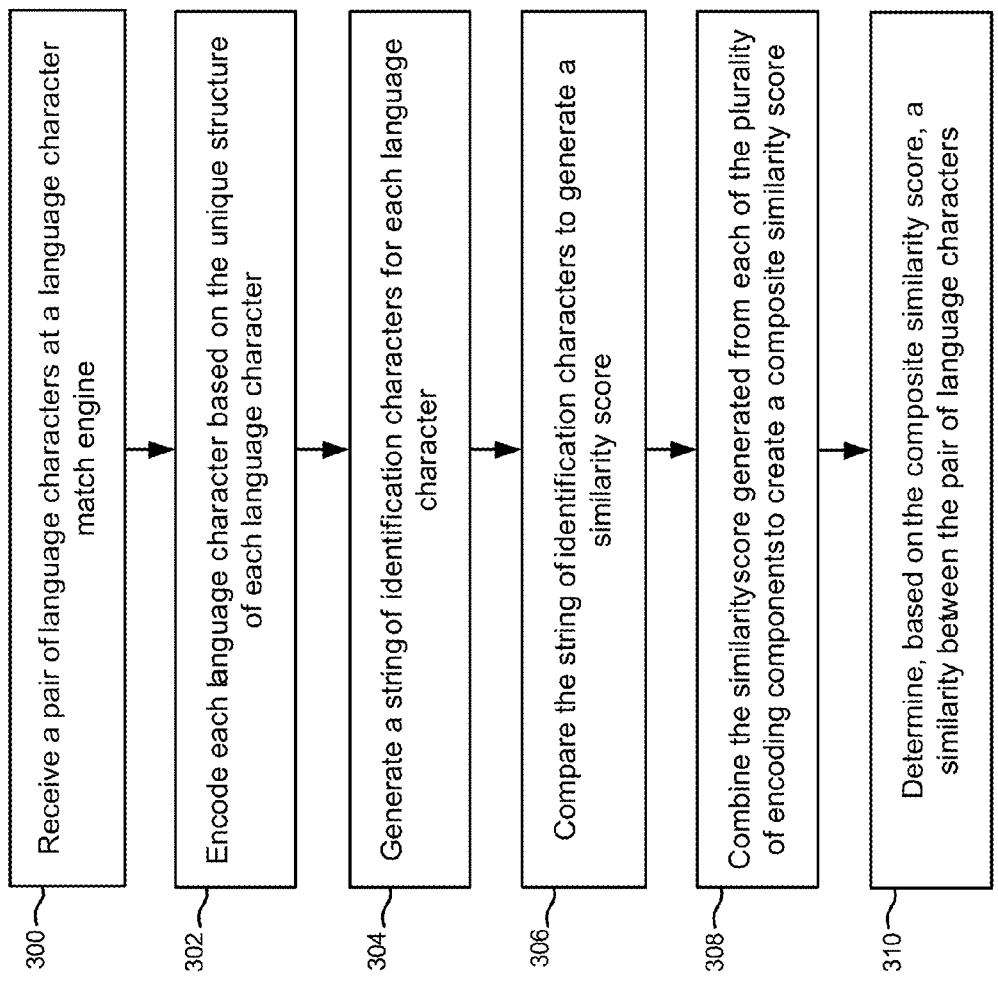
FIG. 3 shows a flowchart of a method in accordance with an embodiment of the invention, for identifying a similarity between language characters for use in an application server or other environment.

FIG. 3 shows a flowchart of a method in accordance with an embodiment of the invention, for identifying the similarity between language characters for use in an application server or other environment. As shown in FIG. 3, at step 300 a pair of language characters is received at a language character match engine, where each language character has a unique structure. The language character match engine is adapted to receive a list of comparator/encoding components that are configured using language characters' structural and/or phonetic information. The list of comparator/encoding components are then used by the language character match engine to encode the pair of language characters.

At step 302, the pair of language characters is encoded based on the unique structure of each language character according by each of the plurality of comparator/encoding components. At step 304, each comparator/encoding component generates a string of identification characters for each language character. Thus, each comparator/encoding component generates a pair of string identification characters (one string of identification characters for each language character). At step 306, a comparator component compares the pair of string identification characters to one another to generate a similarity score for the pair of language characters. At step 308, a composite similarity score is computed by combining the similarity score generated from each comparator/encoding component. At step 310, based on the composite similarity score, a similarity between the pair of language characters is determined.

Figure 4:
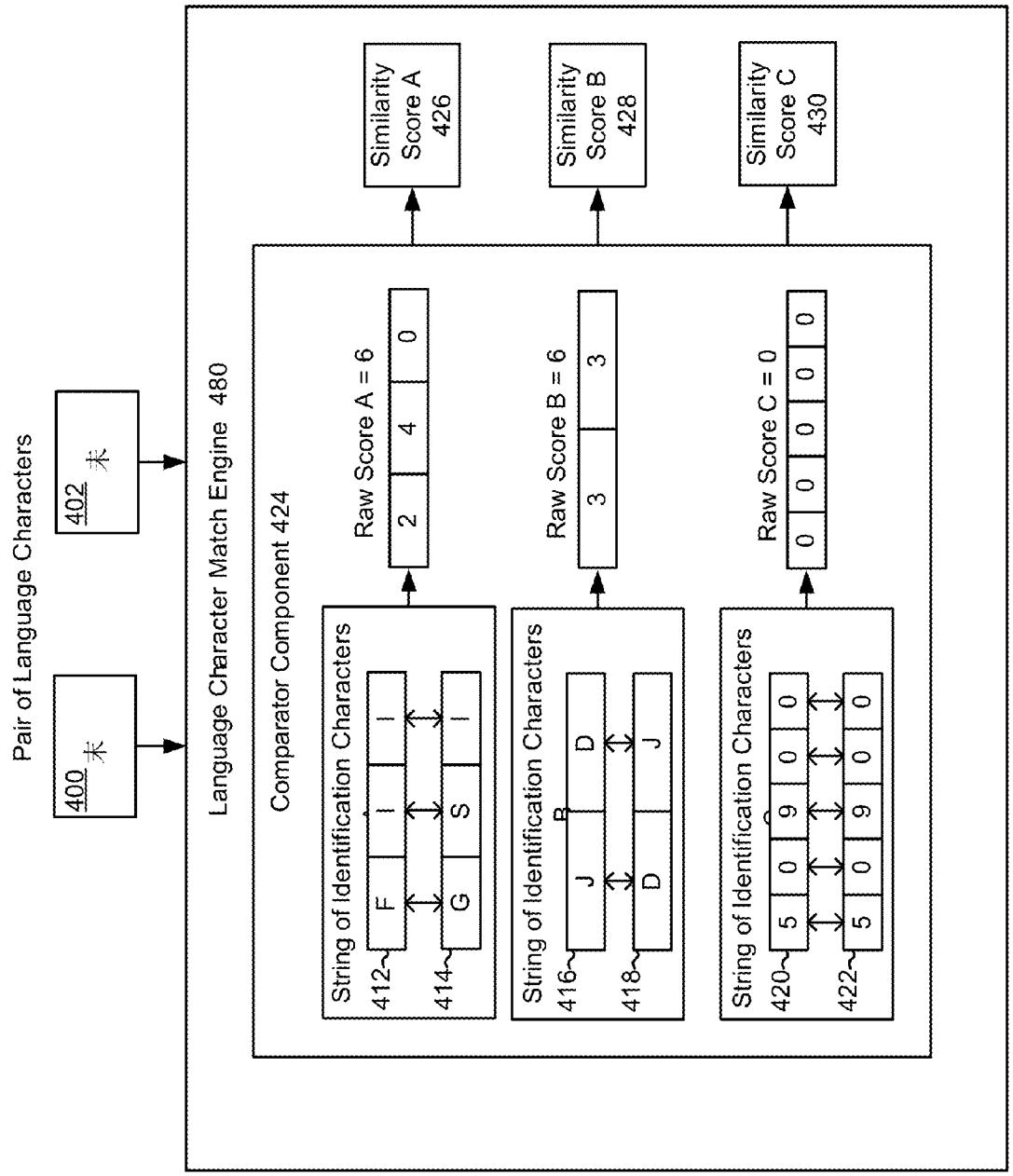
FIG. 4 shows an exemplary system for comparing a string of characters to determine a similarity between language characters, in accordance with an embodiment of the invention.

FIG. 4 shows an exemplary system for comparing a pair of string characters to determine a similarity score, in accordance with an embodiment of the invention. As shown in FIG. 4, a language character match engine 480 includes a comparator component 424 that includes string of identification characters A, B and C. String of identification characters A includes the pair of string identification characters 412 and 414, string of identification characters B includes the pair of string identification characters 416 and 418, and string of identification characters C includes the pair of string identification characters 420 and 422.

The first string of identification characters in each pair of string identification characters (i.e., string of identification characters 412, 416 and 420) is associated with a first language character 400, and the second string of identification characters in each pair of string identification characters (i.e., string of identification characters 414, 418 and 422) is associated with a second language character 402.

The comparator component 424 compares the string of identification characters for each pair of string identification characters to one another. That is, the comparator component 424 compares string of identification characters 412 to string of identification characters 414, string of identification characters 416 to string of identification characters 418, and string of identification characters 420 to string of identification characters 422. The number and type of characters used to represent each string of identification characters depends on the encoding method used to generate the pair of string identification characters. For example, string of identification characters C was encoded using a Four-Corner encoding method to generate a first string of identification characters 420 represented by numbers '50900', and a second string of identification characters 422 represented by numbers '50900'.

In accordance with an embodiment of the invention, the characters used to represent the string of identification characters have an understood value in view of the encoding method used to generate them. For example, the first string of identification characters 420 represented by string '50900' has a known value in view of the Four-Corner encoding method, and other string of identification characters generated from this encoding method can be compared to the first string of identification characters 420.

For example, the digits in the first string of identification characters 420 can be compared to the digits in the second string of identification characters 422; digit by digit (e.g., the first digit in the first string is compared to the first digit in the second string). Since the characters used to represent the string of identification characters have an understood value in view of the encoding method used to generate them, each comparison can result in a score.

A raw score is computed by adding the scores together, and the raw score is normalized, for example, from 0-10. The normalized score is the similarity score for a pair of string identification characters. A composite similarity score is computed by combining the similarity scores associated with each pair of string identification characters (i.e., similarity scores 426, 428 and 430). For example, as described above, a composite comparator/encoding component is a comparator/encoding component that combines the similarity scores generated from multiple comparator/encoding components to compute a composite similarity score between a pair of language characters.

The composite similarity score can be compared to a scale to classify the language characters as an exact match, a partial match, or a mismatch. An exact match is a match where the compared characters are the same, a partial match is where the compared characters are similar, and a mismatch is where the compared characters are different. For example, using the scale, a composite similarity score less than 10 can result in classifying the comparison as an exact match, a composite similarity score greater than 10 and less than 20 can result in classifying the comparison as a partial match, and a composite similarity score greater than 20 can result in classifying the comparison as a mismatch.

Figure 5:
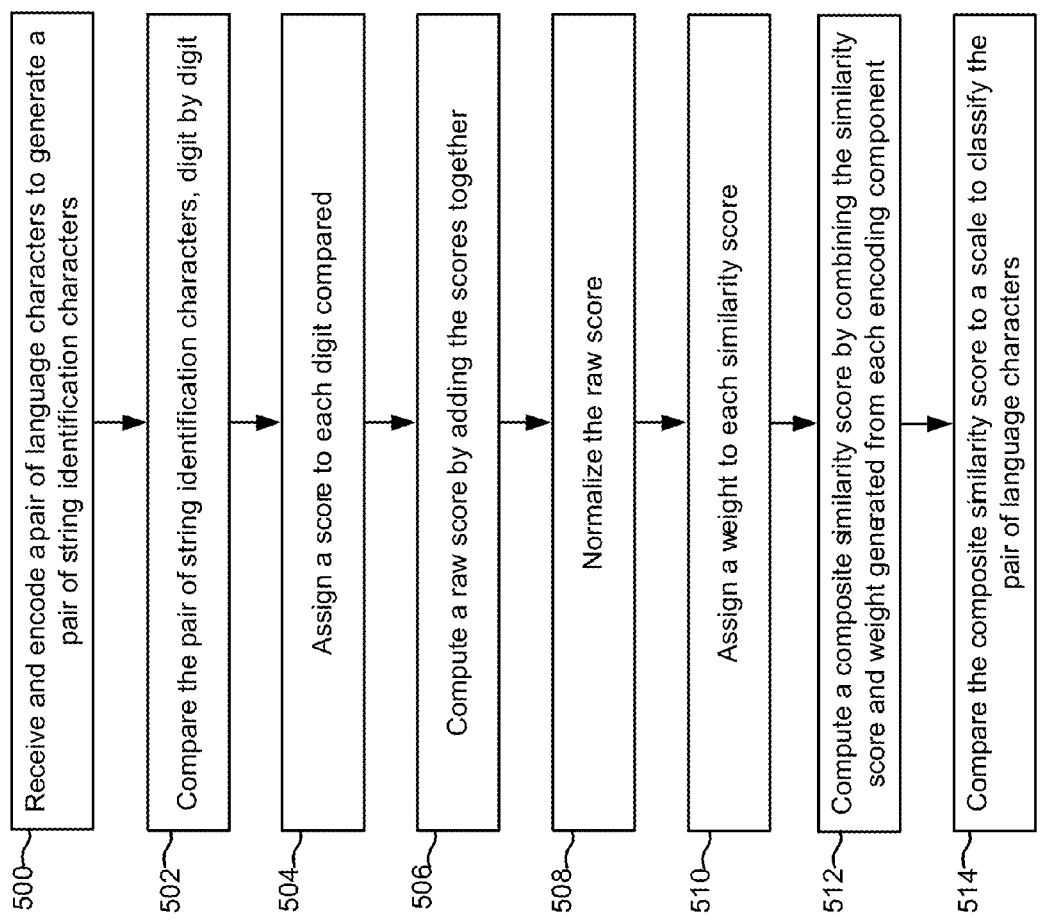
FIG. 5 shows a flowchart of a method in accordance with an alternate embodiment of the invention, for identifying a similarity between language characters for use in an application server or other environment.

FIG. 5 shows a flowchart of a method in accordance with an alternate embodiment of the invention, for identifying the similarity between language characters for use in an application server or other environment. As shown in FIG. 5, at step 500 a pair of language characters is received at a language character match engine. The language character match engine encodes each language character using comparator/encoding configuration information received from a plurality of encoding components to generate a string of identification characters for each language character. Thus, a pair of string identification characters will be generated for each encoding component, where a first string of characters is associated with a first language character, and a second string of characters is associated with a second language character. At step 502, a comparator component compares the pair of string identification characters by comparing the characters/digits in the first string of identification characters to the characters/digits in the second string of identification characters.

For example, a pair of string of identification characters generated from a Four-Corner comparator/encoding component can be compared position by position, where the position of the first digit in a string of identification characters is compared with the position of the first digit in another string of identification characters, the position of the second digit in the string of identification characters is compared with the position of the second digit in the another string of identification characters, etc. However, comparing string identification characters position by position might not work for string of identification characters generated from other comparator/encoding components where gaps need to be taken into consideration to produce a best match result. For example, a pair of sting identification characters (e.g., a first stroke sequence "ABCDEFGH" and a second stroke sequence "ABCDFGH") generated from a strokes comparator/encoder, is best compared if a gap is introduced in the second string between "D" and "F". This way, instead of calculating four matches and three mismatches, seven matches and one gap penalty will be calculated.

At step 504, a score is assigned to each character/digit compared, where an exact match results in a score of zero. At step 506, a raw score is computed by adding the scores together. At step 508, the raw score is normalized. The raw score can be normalized from 0-10, but other normalization scales can be used. For example, the raw score can be normalized from −1 to 1 or from 0-100. The normalized score for pair of string identification characters is the similarity score for that string of identification characters. Thus, if there are three pairs of string identification characters, each pair of string identification characters will have a similarity score.

At step 510, a weight is assigned to each similarity score. For example, if there are three similarity scores, each similarity score can have a weight of one-third. In accordance with an embodiment of the invention, the weight assigned to each similarity score can/be based on the comparator/encoding method used to generate the string of identification characters used to generate the similarity score. The weight associated with each comparator/encoding component can be determined through experimentation, e.g., trial by error, or any other method, to determine a weight for each encoding/comparator component that results in a composite similarity score that best represents the similarity between a pair of language characters. Additionally, the weights associated with each comparator/encoding component can be based on characteristics of the pair of language characters; e.g., based on the number of horizontal and/or vertical lines or any other characteristic of the pair of language characters, and the weights can be used to favor or disfavor comparator/encoding components that rely on those characteristics.

At step 512, the similarity score including weight is combined to compute a composite similarity score. Thus, the composite similarity score is a function of the weight, and the similarity score of that pair of string identification characters. For example, if a first encoding component has a weight of one-third and a similarity score of one, a second encoding component has a weight of one-third and a similarity score of five, and a third encoding component has a weight of one-third and a similarity score of zero, the composite similarity score would be the product of one-third and six (i.e., the addition of one, five and zero), which is two.

At step 514, the composite similarity score is compared to a scale to classify the pair of language characters as an exact match, a partial match, or a mismatch. For example, using a scale where a composite similarity score less than three results in classifying the comparison as an exact match, a composite similarity score greater than three and less than eight results in classifying the comparison as a partial match, and a composite similarity score greater than eight results in classifying the comparison as a mismatch, the classification for a composite similarity score of two is an exact match.

In accordance with an embodiment of the invention, other non-encoding related character attributes, such as total number of strokes and the character's radical can be considered when determining the similarity of a pair of language characters. For example, a score can be assigned to each of the non-encoding character attributes and the score can be used to generate the composite similarity score. Thus, the composite similarity score can include the similarity score from each encoding component and the score assigned to each of the non-encoding character attributes, and based the comparison of the composite similarity score to a scale, the pair of language characters can be classified as an exact match, a partial match or a mismatch.

Additionally, phonetic encodings that represent the similarity between language characters can be used in determining the similarity between a pair of language characters. For example, a phonetic similarity score can be determined for each language character, and the composite similarity score can include the phonetic similarity score. Thus, the composite similarity score can include the similarity score generated from each encoding component and phonetic similarity scores generated from one or more phonetic encoders. Likewise, the composite similarity score can include non-encoding related character attributes, phonetic similarity scores, and the similarity score generated from each encoding component to determine the similarity of a pair of language characters. For example, as described above, the composite similarity score (including the non-encoding related character attributes, phonetic similarity scores, and the similarity score generated from each encoding component) can be compared to a scale, and then based on the comparison, the similarity of the pair of language characters can be determined.

Figure 6:
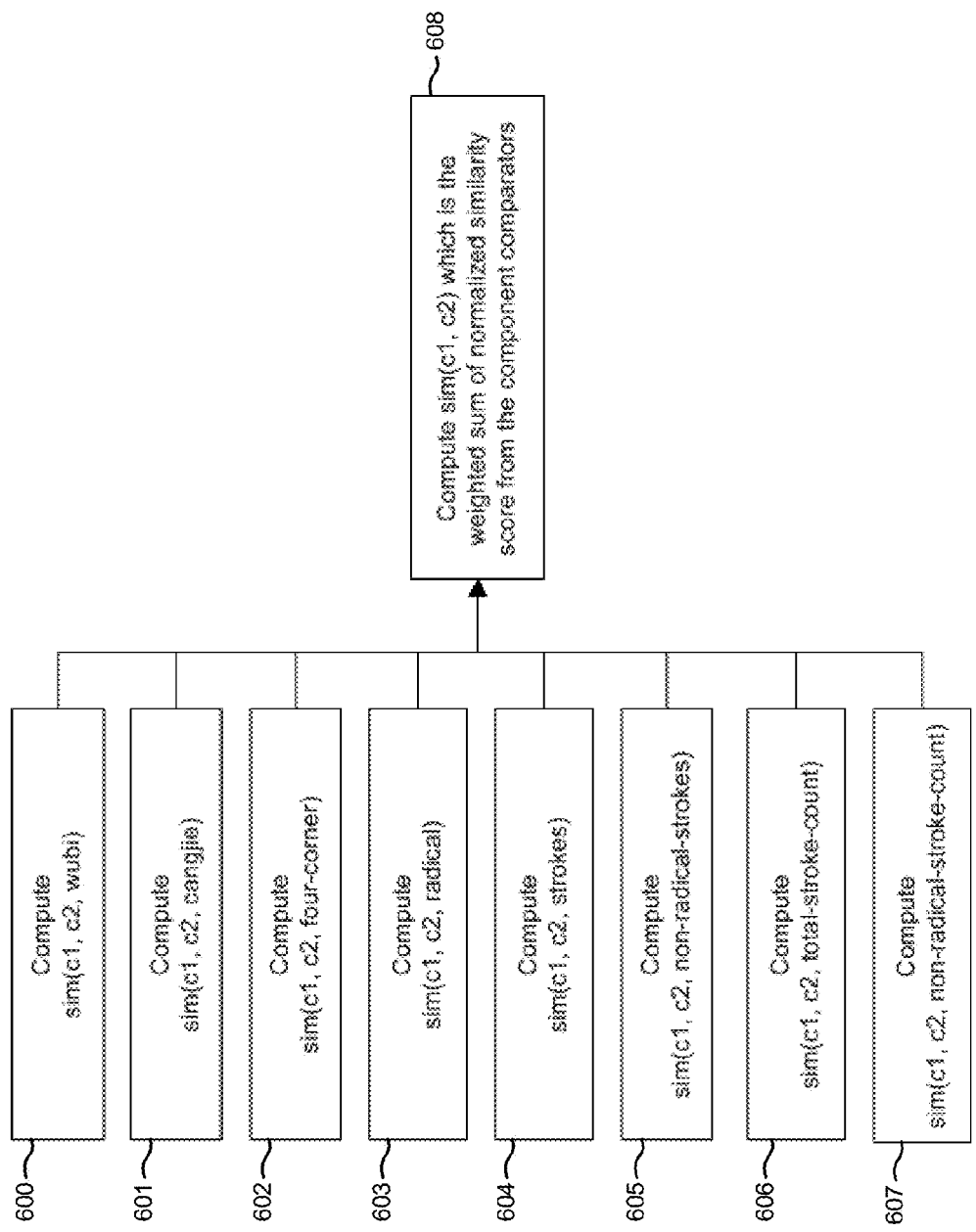
FIG. 6 shows a flowchart of a method in accordance with an embodiment of the invention, for computing the similarity score between a pair of language characters using multiple comparators/encoding components.

FIG. 6 shows a flowchart of a method in accordance with an embodiment of the invention, for computing the similarity score between a pair of language characters using multiple comparator/encoding components. Let c1 and c2 represent language character 1 and language character 2, respectively; and let the expression sim(c1, c2) represent the similarity score between the two language characters. Also let the expression sim(c1, c2, comparator) represent the similarity score between character c1 and c2 for a given comparator. The value of the similarity score is in the range of 0 to 1, inclusive, where a value of 1 represents a complete match and a value of 0 represents a complete mismatch. From these two expressions, a composite similarity score expression can be derived, which can be expressed as:

sim(c1, c2)=Σsim(c1, c2, comparator(i))*W(i); where comparator(i) is a comparator/encoding component, W(i) is the weight assigned to the corresponding comparator/encoding component, and i can be a value from 1 to n, where n is the total number of comparators.

As shown in FIG. 6, between steps 600-607, a similarity score is computed for two language characters using a number of different comparator/encoding components. For example, at step 600 a Wubi comparator/encoding component is used to compute a similarity score between language character 1 and language character 2; and at step 607, a non-radical-stroke-count comparator is used to compute a similarity score between the language characters. At step 608, a composite similarity score is computed by computing the weighed sum of the normalized similarity scores from the comparator/encoding components.

Figure 7:
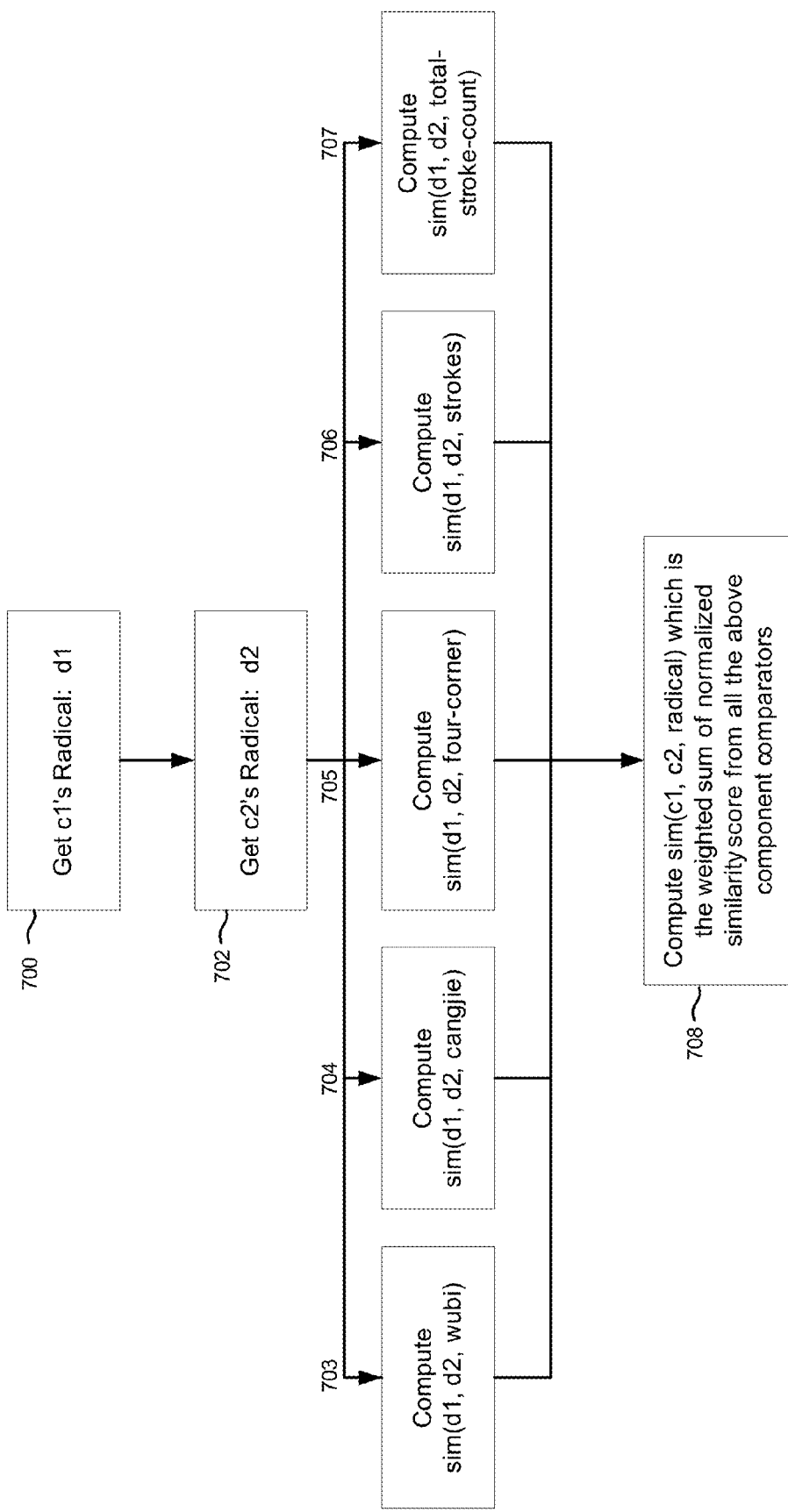
FIG. 7 shows a flowchart of a method in accordance with an embodiment of the invention, for computing the similarity score between a pair of language characters using a radical of the pair of language characters.

FIG. 7 shows a flowchart of a method in accordance with an embodiment of the invention, for computing the similarity score between a pair of language characters using a radical of a pair of language characters. As described above, since a language character's radical is also a language character, a radical comparator/encoding component is actually a specially configured instance of a composite comparator. Accordingly, the radical comparator/encoding component include one or more other comparator/encoding components.

For example, as shown in FIG. 7, at step 700, the first character's radical is retrieved, and at step 702, the second character's radical is retrieved. During each of the steps 703-707, a similarity score between the radical in the first language character and the radical in the second language character is computed using a plurality of different comparator/encoding components (e.g., a Wubi, Cangjie, Four-Corner, strokes, and total-stroke-count comparator). At step 708, a composite similarity score between the first and second language character is computed, where the composite similarity score is the weighted sum of the normalized similarity scores from the plurality of comparator/encoding components.

Edit Distance Distribution

As described above, the composite similarity score is used to represent the structural similarity between a pair of language characters (e.g., a pair of Chinese language characters). In accordance with an embodiment of the invention, an edit distance is another way to represent the structural similarity between a pair of language characters.

The edit distance between a pair of language characters c1 and c2 can be expressed as dist(c1, c2)=100−sim(c1, c2)*100, and since the sim(c1, c2) is in the range of 0 to 1 (a value of 1 being a complete match and a value of 0 being a complete mismatch), the dist(c1, c2) is in the range of 0 to 100, inclusive, where 0 being a complete match and 100 being a complete mismatch.

Figure 8:
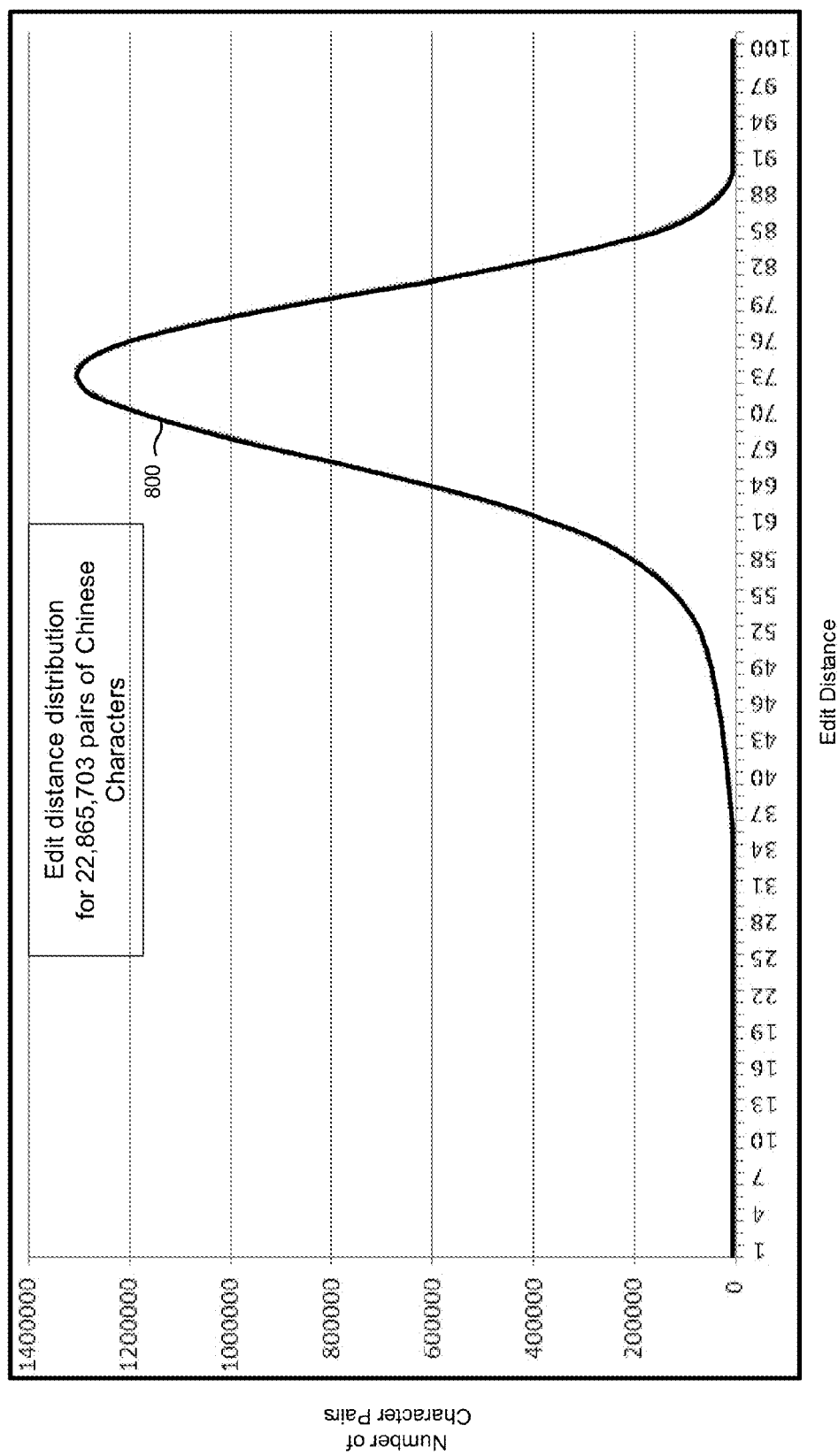
FIG. 8 shows a graph in accordance with an embodiment of the invention, that illustrates an edit distance distribution of a set of language characters.

FIG. 8 shows a graph in accordance with an embodiment of the invention, that
illustrates the edit distance distribution of a set of language characters. As shown in FIG. 8, the horizontal axis represents the edit distance scale from 0-100, and the vertical axis represents total number of character pairs that have a particular edit distance. Line 800 represents the edit distance distribution of the GB-2312 character set using the composite comparator/encoder described in FIG. 6, where the GB-2312 character set includes 6,763 Chinese characters (and therefore 22,865,703 character pairs in total).

Figure 9:
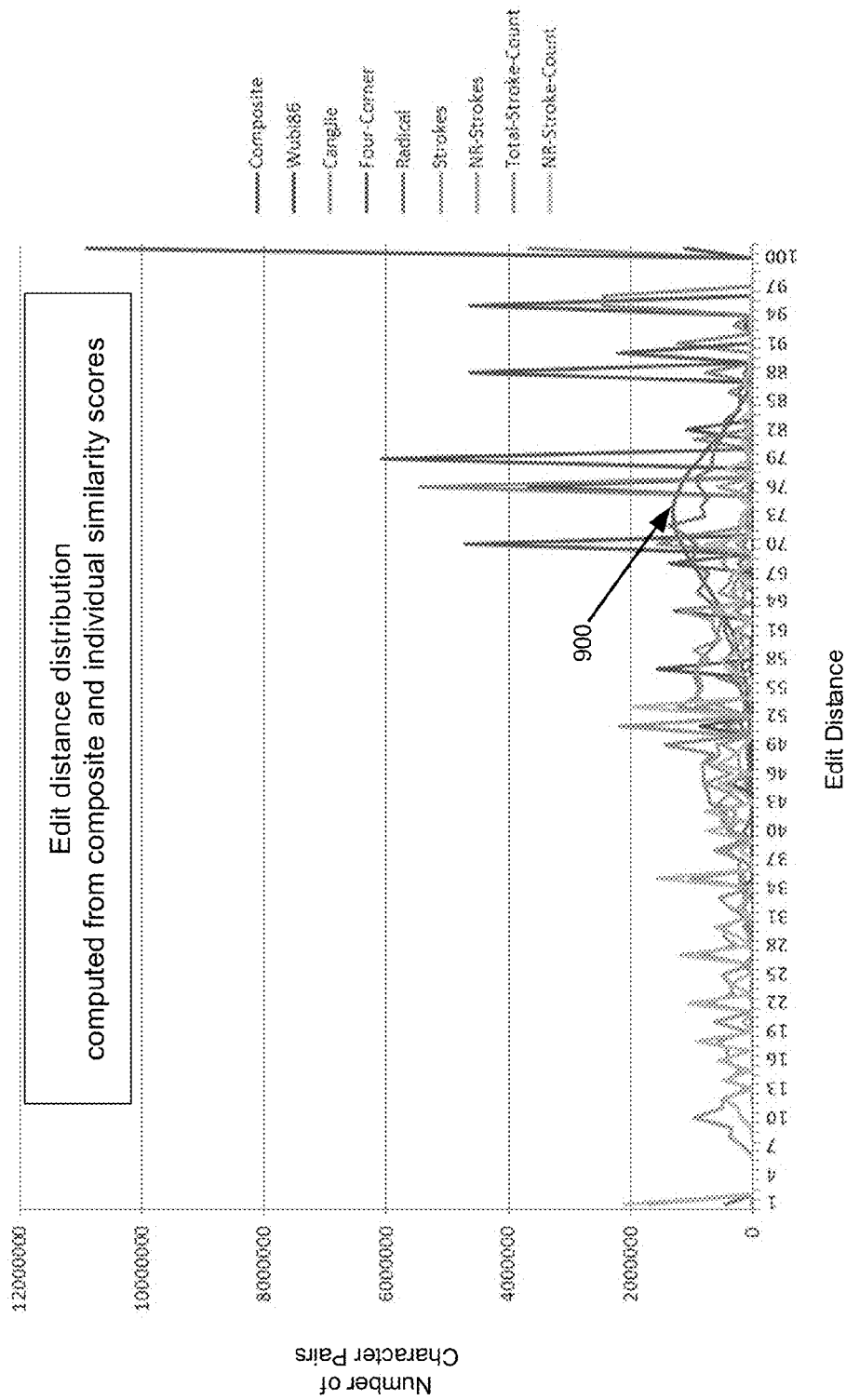
FIG. 9 shows a graph in accordance with an embodiment of the invention, that illustrates an edit distance distribution of a set of language characters computed from composite similarity scores as well as from each individual comparator/encoding component's similarity score.

FIG. 9 shows a graph in accordance with an embodiment of the invention, that illustrates the edit distance distribution of a set of language characters computed from the composite similarity scores as well as the one computed from each individual comparator/encoding component's similarity score. As shown in FIG. 9, an edit distance distribution 900 is shown for a number of comparator/encoding components (e.g., Wubi, Cangjie, Four-Corner, strokes, total-stroke-count comparator), as well as for the composite comparator/encoder described in FIG. 8. As shown, the edit distance distribution generated from the similarity score for each individual comparator does not produce a smooth edit distance distribution. However, the edit distance distribution generated from the similarity score of the composite comparator/encoder does.

Example Uses

In the following example, a composite encoder/comparator is configured based on the following component/encoding comparators (with corresponding weights) to generate a similarity score: Wubi comparator (wt: 0.2), Cangjie comparator (wt: 0.2), Four-Corner comparator (wt: 0.2), Radical comparator (wt: 0.1), Strokes comparator (wt: 0.1), Non-radical strokes comparator (wt: 0.1), Total stroke count comparator (wt: 0.05), Non-radical stroke count comparator (wt: 0.05).

The Radical comparator is an instance of a composite comparator configured with the following component comparators: Wubi comparator (wt: 0.24), Cangjie comparator (wt: 0.23), Four-Corner comparator (wt: 0.23), Strokes comparator (wt: 0.15), and Total stroke count comparator (wt: 0.15).

Given the language character pair (木, 朩), the Wubi encodings for these two characters are "FII" and "GSI", respectively, and using the Wubi encoding/comparator component results in a similarity score of 0.42. The Cangjie encodings for these two characters are "JD" and "DJ", respectively, and using a Cangjie encoding/comparator component results in a similarity score of 0.50. The Four-Corner encodings for these two characters have the exact same value of "5090.0", and therefore, the Four-Corner encoding/comparator component yields a similarity score of 1.0, a perfect match. Since both characters have the exact same radical: "木", the Radical comparator/encoding component yields a similarity score of 1.0, a perfect match. Since both characters have the exact same strokes: "一 丨 丿 丶", the Strokes comparator/encoding component yields a similarity score of 1.0, a perfect match. (The only difference between the two characters is the relative length of the two horizontal strokes, which is not captured by the strokes information). Since both characters have the exact same non-radical strokes: "一", the Non-radical strokes comparator/encoding component yields a similarity score of 1.0, a perfect match. Since both characters have 5 strokes, the Total stroke count comparator/encoding component yields a similarity score of 1.0, a perfect match. Since both characters have 1 non-radical stroke, the Non-radical stroke count comparator yields a similarity score of 1.0, a perfect match.

The individual comparator/encoding components generated similarity score include: 0.42, 0.50, 1.0, 1.0, 1.0, 1.0, 1.0 and 1.0. The overall similarity score between these two characters are a weighted sum of the component scores: 0.42*0.2+0.50*0.2+1.00*0.2+1.00*0.1+1.00*0.1+1.00*0.1+1.00*0.05+1.00*0.05=0.784. Table 2 provides a summary of these results.

TABLE 2

| | Component Comparator | | | | | | | | |
|---|---|---|---|---|---|---|---|---|---|
| Comparator | Wubi | Cangjie | Four-Corner | Radical | Strokes | Non-Radical Strokes | Total Stroke Count | Non-Radical Stroke Count | Composite Comparator |
| Weight | 0.2 | 0.2 | 0.2 | 0.1 | 0.1 | 0.10 | 0.05 | 0.05 | |
| 未 | FII | JD | 5090.0 | 木 | 一丨ノ丶 | — | 5 | 1 | |
| 末 | GSI | DJ | 5090.0 | 木 | 一丨ノ丶 | — | 5 | 1 | |
| Score | 0.42 | 0.50 | 1.00 | 1.00 | 1.00 | 1.00 | 1.00 | 1.00 | 0.784 |

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for improving accuracy of data matching in a middleware machine environment by identifying a similarity between language characters of a character set of a language, wherein each language character has a unique structure, the method comprising:

providing a language character match engine, wherein the language character match engine executes on one or more microprocessor, wherein the language character match engine comprises a plurality of encoding components, including at least a first encoding component and a second encoding component and a third encoding component;

using the language character match engine to generate a composite similarity score set for the character set of the language wherein said similarity index comprises a composite similarity score for each of a plurality of pairs of language characters of the character set of the language;

wherein the composite similarity score for each of the plurality of pairs of language characters is prepared by, receiving the pair of language characters with the language character match engine, using the first encoding component to encode each language character of the pair of language characters based on the unique structure of each language character and generate, for each language character, a first-encoded string of identification characters representing the unique structure of the language character, comparing the first-encoded strings of identification characters for each of the pair of language characters to one another to generate a first-encoding similarity score for the pair of language characters, using the second encoding component to encode each language character of the pair of language characters based on the unique structure of each language character and generate, for each language character, a second-encoded string of identification characters representing the unique structure of the language character, comparing the second-encoded strings of identification characters for each of the pair of language characters to one another to generate a second-encoding similarity score for the pair of language characters, using the third encoding component to encode each language character of the pair of language characters based on the unique structure of each language character and generate, for each language character, a third-encoded string of identification characters representing the unique structure of the language character, comparing the third-encoded strings of identification characters for each of the pair of language characters to one another to generate a third-encoding similarity score for the pair of language characters, and combining the first-encoding similarity score, the second-encoding similarity score, and the third-encoding similarity score for the pair of language characters to generate a composite similarity score for the pair of language characters.

2. The method of claim 1, wherein:

the first encoding component is a Wubi encoding component;

the first encoded strings of characters are Wubi-encoded strings of characters; and the first-encoding similarity score is a Wubi-encoding similarity score.

3. The method of claim 2, wherein:

the second encoding component is a Cangiie encoding component;

the second encoded strings of characters are Cangjie-encoded strings of characters; and the second-encoding similarity score is a Cangjie-encoding similarity score.

4. The method of claim 3, wherein:
the third encoding component is a Four-Corner encoding component;
the third encoded strings of characters are Four-Corner-encoded strings of characters; and
the third-encoding similarity score is a Four-Corner-encoding similarity score.

5. The method of claim 1, further comprising:
associating a first, second and, third predefined weight respectively to each of said first-encoding similarity score, the second-encoding similarity score, and the third-encoding similarity score for the pair of language characters when combining the first-encoding similarity score, the second-encoding similarity score, and the third-encoding similarity score for the pair of language characters to generate the composite similarity score for the pair of language characters.

6. The method of claim 5, further comprising combining the first, second and, third predefined weight respectively with each of said first-encoding similarity score, the second-encoding similarity score, and the third-encoding similarity score for the pair of language characters when combining the first-encoding similarity score, the second-encoding similarity score, and the third-encoding similarity score for the pair of language characters to generate the composite similarity score for the pair of language characters.

7. The method of claim 1, further comprising comparing the composite similarity for the pair of language characters score to a scale to classify the pair of language characters as one of an exact match, a partial match, and a mismatch.

8. The method of claim 1, further comprising determining an edit distance between each of the plurality of pairs of language characters based on the composite similarity score of each of the pairs of language characters of the language.

9. The method of claim 1, wherein, comparing the first-encoded strings of identification characters for each of the pair of language characters to one another to generate a first-encoding similarity score for the pair of language characters, comprises:
comparing first-encoded strings of identification characters to one another, digit by digit;
assigning a score to each digit compared;
computing a raw score by adding together the score from each digit compared; and
normalizing the raw score to compute the first encoding similarity score.

10. The method of claim 1, further comprising
using a fourth encoding component to encode each language character of the pair of language characters based on phonetic properties of said characters, and generate, for each language character, a fourth-encoded string of identification characters representing the phonetic properties of the language character;
comparing the fourth-encoded strings of identification characters for each of the pair of language characters to one another to generate a fourth-encoding similarity score for the pair of language characters; and
wherein said combining step comprises combining the first-encoding similarity score, the second-encoding similarity score, the third-encoding similarity score, and the fourth encoding similarity score for the pair of language characters to generate said composite similarity score for the pair of language characters.

11. A non-transitory computer readable storable medium storing instructions thereon for improving accuracy of data matching in a middleware machine environment by identifying a similarity between language characters of a language, wherein each language character has a unique structure, which instructions, when processed in a middleware machine of said middleware machine environment, cause the middleware machine to perform steps comprising:
using the language character match engine to generate a composite similarity score set for the character set of the language wherein said similarity index comprises a composite similarity score for each of a plurality of pairs of language characters of the character set of the language, and wherein the composite similarity score for each of the plurality of pairs of language characters is prepared by,
receiving the pair of language characters with a character match engine,
using a first encoding component of the character match engine to encode each language character of the pair of language characters based on the unique structure of each language character and generate, for each language character, a first-encoded string of identification characters representing the unique structure of the language character,
comparing the first-encoded strings of identification characters for each of the pair of language characters to one another to generate a first-encoding similarity score for the pair of language characters,
using a second encoding component of the character match engine to encode each language character of the pair of language characters based on the unique structure of each language character and generate, for each language character, a second-encoded string of identification characters representing the unique structure of the language character,
comparing the second-encoded strings of identification characters for each of the pair of language characters to one another to generate a second-encoding similarity score for the pair of language characters,
using a third encoding component of the character match engine to encode each language character of the pair of language characters based on the unique structure of each language character and generate, for each language character, a third-encoded string of identification characters representing the unique structure of the language character,
comparing the third-encoded strings of identification characters for each of the pair of language characters to one another to generate a third-encoding similarity score for the pair of language characters, and
combining the first-encoding similarity score, the second-encoding similarity score, and the third-encoding similarity score for the pair of language characters to generate a composite similarity score for the pair of language characters.

12. The non-transitory computer readable storable medium of claim 11, wherein:
the third encoding component is a Four-Corner encoding component;
the third encoded strings of characters are Four-Corner-encoded strings of characters; and
the third-encoding similarity score is a Four-Corner-encoding similarity score.

13. The non-transitory computer readable storable medium of claim 12, wherein:
the second encoding component is a Cangjie encoding component;
the second encoded strings of characters are Cangjie-encoded strings of characters; and the second-encoding similarity score is a Cangjie-encoding similarity score.

14. The non-transitory computer readable storable medium of claim 13, wherein:
the first encoding component is a Wubi encoding component;
the first encoded strings of characters are Wubi-encoded strings of characters; and
the first-encoding similarity score is a Wubi-encoding similarity score.

15. The non-transitory computer readable storable medium of claim 11, storing further instructions thereon, which instructions, when processed in a middleware machine of said middleware machine environment, cause the middleware machine to perform further steps comprising:
associating a first, second and, third predefined weight respectively to each of said first-encoding similarity score, the second-encoding similarity score, and the third-encoding similarity score for the pair of language characters when combining the first-encoding similarity score, the second-encoding similarity score, and the third-encoding similarity score for the pair of language characters to generate the composite similarity score for the pair of language characters.

16. The non-transitory computer readable storable medium of claim 11, wherein, comparing the first-encoded strings of identification characters for each of the pair of language characters to one another to generate a first-encoding similarity score for the pair of language characters, comprises:
comparing first-encoded strings of identification characters to one another, digit by digit;
assigning a score to each digit compared;
computing a raw score by adding together the score from each digit compared; and
normalizing the raw score to compute the first encoding similarity score.

17. The non-transitory computer readable storable medium of claim 11, storing further instructions thereon, which instructions, when processed in a middleware machine of said middleware machine environment, cause the middleware machine to perform further steps comprising:
using a fourth encoding component of said character match engine to encode each language character of the pair of language characters based on phonetic properties of said characters, and generate, for each language character, a fourth-encoded string of identification characters representing the phonetic properties of the language character;
comparing the fourth-encoded strings of identification characters for each of the pair of language characters to one another to generate a fourth-encoding similarity score for the pair of language characters; and
wherein said combining step comprises combining the first-encoding similarity score, the second-encoding similarity score, the third-encoding similarity score, and the fourth encoding similarity score for the pair of language characters to generate said composite similarity score for the pair of language characters.

18. A system for generating a similarity index identifying a similarity between language characters of a language, wherein each language character has a unique structure, the system comprising:
a computer system comprising a microprocessor and a memory and a language character match engine, wherein said language character match engine comprises a plurality of encoding components for encoding a plurality of pairs of language characters of the language based on the unique structure of each language character;
a first encoding component of the language character match engine which is configured to encode each language character of each of said plurality of pairs of language characters based on the unique structure of each language character, generate a first-encoded string of identification characters representing the unique structure of each language character, and compare the first-encoded strings of identification characters generated for each language character to one another to generate a first-encoding similarity score for each of the plurality of pairs of language characters;
a second encoding component of the language character match engine which is configured to encode each language character of each of said plurality of pairs of language characters based on the unique structure of each language character, generate a second-encoded string of identification characters representing the unique structure of each language character, and compare the second-encoded strings of identification characters generated for each language character to one another to generate a second-encoding similarity score for each of the plurality of pairs of language characters;
a third encoding component of the language character match engine which is configured to, encode each language character of each of said plurality of pairs of language characters based on the unique structure of each language character, generate a third-encoded string of identification characters representing the unique structure of each language character, and compare the third-encoded strings of identification characters generated for each language character to one another to generate a third-encoding similarity score for each of the plurality of pairs of language characters;
wherein said language character match engine is configured to create a composite similarity score set for the character set of the language by receiving each of said plurality of pairs of language characters, and combining the first-encoding similarity score, the second-encoding similarity score and the third-encoding similarity score for each of the plurality of pairs of language characters to compute a composite similarity score for each of the plurality of pairs of language characters.

19. The system of claim 18, wherein:
the third encoding component is a Four-Corner encoding component;
the second encoding component is a Cangjie encoding component; and
the first encoding component is a Wubi encoding component.

20. The system of claim 19, wherein the language character match engine is configured to associate a first, second and, third predefined weight respectively to each of said first-encoding similarity score, the second-encoding similarity score, and the third-encoding similarity score for the pair of language characters when combining the first-encoding similarity score, the second-encoding similarity score, and the third-encoding similarity score for the pair of language characters to generate the composite similarity score for the pair of language characters.

* * * * *